(12) United States Patent
Kumar

(10) Patent No.: US 8,075,843 B2
(45) Date of Patent: Dec. 13, 2011

(54) EXHAUST GAS TREATMENT DEVICE

(75) Inventor: Amit Kumar, Getzville, NY (US)

(73) Assignee: Unifrax I LLC, Niagara Falls, NY (US)

( * ) Notice: Subject to any disclaimer, the term of this patent is extended or adjusted under 35 U.S.C. 154(b) by 0 days.

(21) Appl. No.: 12/761,796

(22) Filed: Apr. 16, 2010

(65) Prior Publication Data

US 2010/0266462 A1    Oct. 21, 2010

Related U.S. Application Data

(60) Provisional application No. 61/170,391, filed on Apr. 17, 2009.

(51) Int. Cl.
*B01D 50/00* (2006.01)
*F01N 3/10* (2006.01)

(52) U.S. Cl. ............. 422/177; 422/180; 60/299; 60/300

(58) Field of Classification Search .................. 422/168, 422/170, 179, 180; 60/290, 300; 428/221, 428/688; 55/523
See application file for complete search history.

(56) References Cited

U.S. PATENT DOCUMENTS

| | | | |
|---|---|---|---|
| 3,224,927 A | 12/1965 | Brown et al. | |
| 3,458,329 A | 7/1969 | Owens et al. | |
| 3,649,406 A | 3/1972 | McNish | |
| 3,771,967 A | 11/1973 | Nowak | |
| 3,798,006 A | 3/1974 | Balluff | |
| 3,916,057 A | 10/1975 | Hatch et al. | |
| 3,996,145 A | 12/1976 | Hepburn | |
| 4,048,363 A | 9/1977 | Langer et al. | |
| 4,093,423 A | 6/1978 | Neumann | |
| 4,101,280 A | 7/1978 | Frietzsche et al. | |
| 4,142,864 A | 3/1979 | Rosynsky et al. | |
| 4,156,533 A | 5/1979 | Close et al. | |
| 4,204,907 A | 5/1980 | Korklan et al. | |
| 4,239,733 A | 12/1980 | Foster et al. | |
| 4,269,807 A | 5/1981 | Bailey et al. | |

(Continued)

FOREIGN PATENT DOCUMENTS

DE    196 38 542 A1    3/1997

(Continued)

OTHER PUBLICATIONS

International Search Report, Form PCT/ISA/210, for PCT International Patent Application No. PCT/US2010/001149 corresponding to U.S. Appl. No. 12/761,796, mailing date Jan. 21, 2011.

(Continued)

*Primary Examiner* — Nina Bhat
(74) *Attorney, Agent, or Firm* — Curatolo Sidoti Co., LPA; Joseph G. Curatolo; Salvatore A. Sidoti

(57) ABSTRACT

A flexible and substantially crack resistant intumescent, non-intumescent, or hybrid mounting mat material for use in mounting fragile structures includes at least one intumescent, non-intumescent or hybrid layer containing inorganic fibers and reinforcing layer applied to the layer. Also provided is an exhaust gas treatment device including a housing, a fragile catalyst support structure mounted within the housing, and the crack resistant mounting mat disposed in a gap between the housing and the fragile catalyst support structure. Also disclosed are methods of making a mounting mat for an exhaust gas treatment device and for making an exhaust gas treatment device incorporating the mounting mat.

60 Claims, 2 Drawing Sheets

U.S. PATENT DOCUMENTS

| | | | |
|---|---|---|---|
| 4,271,228 | A | 6/1981 | Foster et al. |
| 4,279,864 | A | 7/1981 | Nara et al. |
| 4,305,992 | A | 12/1981 | Langer et al. |
| 4,328,187 | A | 5/1982 | Musall et al. |
| 4,332,852 | A | 6/1982 | Korklan et al. |
| 4,335,077 | A | 6/1982 | Santiago et al. |
| 4,353,872 | A | 10/1982 | Midorikawa |
| 4,385,135 | A | 5/1983 | Langer et al. |
| 4,617,176 | A | 10/1986 | Merry |
| 4,693,338 | A | 9/1987 | Clerc |
| 4,735,757 | A | 4/1988 | Yamamoto et al. |
| 4,746,570 | A | 5/1988 | Suzaki et al. |
| 4,752,515 | A | 6/1988 | Hosoi et al. |
| 4,797,263 | A | 1/1989 | Oza |
| 4,863,700 | A | 9/1989 | Ten Eyck |
| 4,865,818 | A | 9/1989 | Merry et al. |
| 4,927,608 | A | 5/1990 | Wörner et al. |
| 4,929,429 | A | 5/1990 | Merry |
| 4,985,212 | A | 1/1991 | Kawakami et al. |
| 4,999,168 | A | 3/1991 | Ten Eyck |
| 5,008,086 | A | 4/1991 | Merry |
| 5,032,441 | A | 7/1991 | Ten Eyck et al. |
| 5,073,432 | A | 12/1991 | Horikawa et al. |
| 5,079,280 | A | 1/1992 | Yang et al. |
| 5,094,073 | A | 3/1992 | Wörner et al. |
| 5,094,074 | A | 3/1992 | Nishizawa et al. |
| 5,119,551 | A | 6/1992 | Abbott |
| 5,145,811 | A | 9/1992 | Lintz et al. |
| 5,151,253 | A | 9/1992 | Merry et al. |
| 5,242,871 | A | 9/1993 | Hashimoto et al. |
| 5,250,269 | A | 10/1993 | Langer |
| 5,254,410 | A | 10/1993 | Langer et al. |
| 5,258,216 | A | 11/1993 | Von Bonin et al. |
| 5,290,522 | A | 3/1994 | Rogers et al. |
| 5,332,609 | A | 7/1994 | Corn |
| 5,332,699 | A | 7/1994 | Olds et al. |
| 5,340,643 | A | 8/1994 | Ou et al. |
| 5,376,341 | A | 12/1994 | Gulati |
| 5,380,580 | A | 1/1995 | Rogers et al. |
| 5,384,188 | A | 1/1995 | Lebold et al. |
| 5,389,716 | A | 2/1995 | Graves |
| 5,453,116 | A | 9/1995 | Fischer et al. |
| 5,482,686 | A * | 1/1996 | Lebold et al. .................. 422/179 |
| 5,488,826 | A | 2/1996 | Paas |
| 5,523,059 | A | 6/1996 | Langer |
| 5,580,532 | A * | 12/1996 | Robinson et al. ............. 422/179 |
| 5,585,312 | A | 12/1996 | Ten Eyck et al. |
| 5,666,726 | A | 9/1997 | Robinson et al. |
| 5,714,421 | A | 2/1998 | Olds et al. |
| 5,736,109 | A | 4/1998 | Howorth et al. |
| 5,811,063 | A * | 9/1998 | Robinson et al. ............. 422/179 |
| 5,811,360 | A | 9/1998 | Jubb |
| 5,821,183 | A | 10/1998 | Jubb |
| 5,853,675 | A | 12/1998 | Howorth |
| 5,862,590 | A | 1/1999 | Sakashita et al. |
| 5,869,010 | A | 2/1999 | Langer |
| 5,874,375 | A | 2/1999 | Zoitos et al. |
| 5,882,608 | A | 3/1999 | Sanocki et al. |
| 5,928,975 | A | 7/1999 | Jubb |
| 5,955,177 | A | 9/1999 | Sanocki et al. |
| 5,955,389 | A | 9/1999 | Jubb |
| 6,000,131 | A | 12/1999 | Schmitt |
| 6,025,288 | A | 2/2000 | Zoitos et al. |
| 6,030,910 | A | 2/2000 | Zoitos et al. |
| 6,051,193 | A | 4/2000 | Langer et al. |
| 6,101,714 | A | 8/2000 | Schmitt |
| 6,158,120 | A | 12/2000 | Foster et al. |
| 6,162,404 | A | 12/2000 | Tojo et al. |
| 6,183,852 | B1 | 2/2001 | Rorabaugh et al. |
| 6,231,818 | B1 * | 5/2001 | TenEyck ....................... 422/179 |
| 6,317,976 | B1 | 11/2001 | Aranda et al. |
| 6,365,267 | B1 * | 4/2002 | Langer et al. ................. 428/324 |
| 6,589,488 | B1 | 7/2003 | Eyhorn |
| 6,726,884 | B1 | 4/2004 | Dillon et al. |
| 6,737,146 | B2 | 5/2004 | Schierz et al. |
| 6,756,107 | B1 | 6/2004 | Schierz et al. |
| 6,855,298 | B2 * | 2/2005 | TenEyck ....................... 422/179 |
| 6,861,381 | B1 | 3/2005 | Jubb et al. |
| 6,923,942 | B1 | 8/2005 | Shirk et al. |
| 6,953,757 | B2 | 10/2005 | Zoitos et al. |
| 7,033,412 | B2 * | 4/2006 | Kumar et al. ................... 55/523 |
| 7,153,796 | B2 | 12/2006 | Jubb et al. |
| 7,259,118 | B2 | 8/2007 | Jubb et al. |
| 7,261,864 | B2 * | 8/2007 | Watanabe ..................... 422/179 |
| 7,276,280 | B2 * | 10/2007 | Dinwoodie et al. .......... 428/221 |
| 7,387,822 | B2 | 6/2008 | Dinwoodie |
| 7,550,118 | B2 * | 6/2009 | Merry ........................... 422/179 |
| 7,820,117 | B2 | 10/2010 | Peisert et al. |
| 7,854,904 | B2 * | 12/2010 | Merry ........................... 422/179 |
| 7,887,917 | B2 | 2/2011 | Zoitos et al. |
| 7,971,357 | B2 | 7/2011 | Ten Eyck et al. |
| 2001/0036427 | A1 | 11/2001 | Yamada et al. |
| 2002/0025904 | A1 | 2/2002 | Goto et al. |
| 2002/0127154 | A1 | 9/2002 | Foster et al. |
| 2003/0049180 | A1 | 3/2003 | Fukushima |
| 2003/0185724 | A1 | 10/2003 | Anji et al. |
| 2004/0052694 | A1 | 3/2004 | Nishikawa et al. |
| 2004/0234436 | A1 | 11/2004 | Howorth |
| 2005/0272602 | A1 | 12/2005 | Ninomiya |
| 2006/0008395 | A1 | 1/2006 | Ten Eyck et al. |
| 2006/0153746 | A1 | 7/2006 | Merry et al. |
| 2006/0154040 | A1 | 7/2006 | Merry |
| 2006/0278323 | A1 | 12/2006 | Eguchi |
| 2007/0065349 | A1 | 3/2007 | Merry |
| 2007/0207069 | A1 | 9/2007 | Kariya et al. |
| 2008/0253939 | A1 | 10/2008 | Hornback |
| 2009/0060800 | A1 | 3/2009 | Fernandez |
| 2009/0060802 | A1 | 3/2009 | Beauharnois |
| 2009/0114097 | A1 | 5/2009 | Saiki |
| 2009/0162256 | A1 | 6/2009 | Ten Eyck et al. |
| 2009/0208732 | A1 * | 8/2009 | Middendorf et al. ......... 428/332 |
| 2010/0207298 | A1 | 8/2010 | Kunze et al. |
| 2010/0209308 | A1 * | 8/2010 | Kunze et al. .................. 422/179 |

FOREIGN PATENT DOCUMENTS

| | | |
|---|---|---|
| EP | 0 205 704 A1 | 12/1986 |
| EP | 0 319 299 A2 | 6/1989 |
| EP | 0 508 751 A1 | 10/1992 |
| EP | 0 551 532 A1 | 7/1993 |
| EP | 0 643 204 A2 | 3/1995 |
| EP | 0 765 993 A1 | 4/1997 |
| EP | 0 803 643 A1 | 10/1997 |
| EP | 1 495 807 A1 | 1/2005 |
| EP | 1 696 110 A1 | 8/2006 |
| EP | 1 905 895 A1 | 4/2008 |
| EP | 1 931 862 A1 | 6/2008 |
| EP | 1 950 035 A1 | 7/2008 |
| GB | 1 438 762 A | 6/1976 |
| GB | 1 513 808 A | 6/1978 |
| GB | 2 200 129 A | 7/1988 |
| JP | 4-83773 A | 3/1992 |
| JP | 6-272549 | 9/1994 |
| JP | 7-286514 | 10/1995 |
| WO | WO 91/11498 A1 | 8/1991 |
| WO | WO 97/32118 A1 | 9/1997 |
| WO | WO 99/23370 | 5/1999 |
| WO | WO 99/46028 A1 | 9/1999 |
| WO | WO 00/75496 A1 | 4/2000 |
| WO | WO 00-33946 | 6/2000 |
| WO | WO 01/65008 A1 | 9/2001 |
| WO | WO 01/83956 | 11/2001 |
| WO | WO 02/33233 A1 | 4/2002 |
| WO | WO 02/053511 A1 | 7/2002 |
| WO | WO 03/000414 A1 | 1/2003 |
| WO | WO 03/031368 A2 | 4/2003 |
| WO | WO 2008/103525 A2 | 8/2008 |
| WO | WO 2008/154078 A1 | 12/2008 |
| WO | WO 2008/156942 A1 | 12/2008 |

OTHER PUBLICATIONS

International Written Opinion of the International Searching Authority, form PCT/ISA/237, for PCT International Patent Application No. PCT/US2010/001149 corresponding to U.S. Appl. No. 12/761,796, mailing date Jan. 21, 2011.

Product Brochure—"There's More to it Than You Think. HDK—Pyrogenic Silica", Wacker Silicones, 6173/10.051e, Oct. 2005.

Technical Data Sheet—"HDK N20 Pyrogenic Silica", Wacker Silicones, Version 1.0, Jun. 12, 2008.

English language abstract of DE 19858025; Publication Date: Jun. 21, 2000; Applicant: Aslgawo GmbH.

Tosa Shin'ichi, et al., "The Development of Converter Canning Technology for Thin Wall Substrate." Honda R&D Tech. Rev., vol. 12, No. 1, pp. 175-182, Japan (2000).

Gulati, Ten Eyck & Lebold. "Durable Packaging Design for Cordierite Ceramic Catalysts for Motorcycle Application" Society of Automotive Engineers Meeting, Detroit, MI, Mar. 1, 1993.

Maret, Gulati, Lambert & Zink. Systems Durability of a Ceramic Racetrack Converter. International Fuels and Lubricants Meeting, Toronto, Canada, Oct. 7-10, 1991.

* cited by examiner

EXHAUST GAS TREATMENT DEVICE

CROSS REFERENCE TO RELATED APPLICATIONS

This application claims the benefit of the filing date, under 35 U.S.C. §119(e) of U.S. Provisional Application for Patent Ser. No. 61/170,391, filed on Apr. 17, 2009, which is incorporated herein by reference as if fully written out below.

TECHNICAL FIELD

A device for the treatment of exhaust gases is provided, such as automotive catalytic converters or diesel particulate traps, having a fragile catalyst support structure mounted within a housing by a flexible and substantially crack resistant mounting mat disposed between the housing and the fragile structure.

BACKGROUND

Exhaust gas treatment devices for treating exhaust gases of automotive engines are used to effect the oxidation of carbon monoxide and hydrocarbons and the reduction of oxides of nitrogen present in the exhaust gases.

An automotive catalytic converter generally includes an outer metallic housing and a fragile catalyst support structure that is held within the outer metallic housing by a mounting mat. The mounting mat is positioned between the inner surface of the outer metallic housing and the outer surface of the fragile catalyst support structure. The fragile catalyst support structure is commonly referred to in the art as a "monolith". The monolith may be made from a ceramic or metallic material. The mounting mat provides thermal insulation and a holding pressure sufficient for maintaining the fragile catalyst support structure in proper position during the operation of the catalytic converter.

A diesel particulate trap is used in automobiles that utilize diesel fuel. The diesel particulate trap generally includes an outer metallic housing and a fragile particulate filter structure that is held within the outer metallic housing by a mounting mat. The mounting mat is positioned between the inner surface of the housing and the outer surface of the particulate filter. Like the catalytic converter, the mat provides thermal insulation and a holding pressure for maintaining the particulate filter in proper position within the outer metallic housing during operation of the diesel particulate filter.

As noted hereinabove, the catalyst support structure of the catalytic and the diesel particulate filter are often very fragile. In fact, these structures can be so fragile that even small shockloads or stresses are often sufficient to crack or crush them. In order to protect the fragile structures from thermal and mechanical shock and other stresses noted above, as well as to provide thermal insulation and a gas seal, and to hold the fragile structures in place within the housing, it is known to position at least one ply or layer of mounting or support material within the gap between the fragile structure and the housing. Thus, the mounting mats that are positioned between the outer housing and the fragile catalyst support structure or particulate filter in the automotive exhaust gas treatment device are capable of exhibiting high temperature resistance and are capable of exerting the requisite holding pressure to maintain the catalyst support structure or particulate filter in proper position during the operation of the device.

An exhaust gas treatment device is made by wrapping the mounting mat around at least a portion of the perimeter of the fragile catalyst support structure or diesel particulate filter and locating the wrapped structure within a housing. During the wrapping of the catalyst support structure or diesel particulate filter, the mounting mat must be bent around the fragile catalyst support structure. Tensile stresses are exerted on the mounting mat which can result in cracking or tearing of the mounting mat. For intumescent mats, flaking of the vermiculite in the mat may also occur. As can be appreciated, the problem is exacerbated when heavy basis weight mounting mats are used to wrap the fragile structures or when the wrap is around a tight radius, such as for oval-shaped structures. Consequently, there is a need for a mounting mat material which is flexible and substantially crack resistant, while still providing the desired thermal insulation and holding pressure performance.

SUMMARY

Provided is a substantially crack resistant mounting mat for an exhaust gas treatment device comprising an intumescent, non-intumescent, or hybrid layer having opposite facing major surfaces and a reinforcing layer, such as a reinforcing coating, applied to at least a portion of at least one of said major surfaces.

Also provided is an exhaust gas treatment device comprising a housing, a fragile catalyst support structure mounted within said housing, and a mounting mat disposed in a gap between said housing and said fragile catalyst support structure, wherein said mounting mat comprises an intumescent, non-intumescent, or hybrid layer having opposite facing major surfaces and a reinforcing layer, such as a reinforcing coating, applied to at least a portion of at least one of said major surfaces.

Additionally provided is a method for making a mounting mat for holding a fragile catalyst support structure within the housing of an exhaust gas treatment device comprising providing or preparing an intumescent, non-intumescent, or hybrid layer having opposite facing major surfaces and applying a reinforcing layer, such as a reinforcing coating, to at least a portion of at least one of said major surfaces of said intumescent or non-intumescent sheet layer.

Further provided is a method of making a device for treating exhaust gases comprising wrapping a mounting mat comprising an intumescent, non-intumescent, or hybrid layer having opposite facing major surfaces and a reinforcing layer, such as a reinforcing coating, applied to at least a portion of at least one of said major surfaces around a portion of a fragile catalyst support structure for treating exhaust gases and locating the wrapped fragile catalyst support structure within a housing, whereby the mounting mat holds the fragile structure resiliently within the housing.

Further provided is an end cone for an exhaust gas treatment device comprising an outer metallic end cone, an inner metallic end cone, and end cone insulation disposed between said outer and inner metallic end cones, said end cone insulation comprising an intumescent, non-intumescent, or hybrid layer having opposite facing major surfaces and a reinforcing layer, such as a reinforcing coating, applied to at least a portion of at least one of said major surfaces

DETAILED DESCRIPTION

A mounting mat for exhaust gas treatment device applications is disclosed. The mounting mat includes at least one ply or sheet that is comprised of heat resistant inorganic fibers. According to certain illustrative embodiments, the mounting mat may optionally include an intumescent material. The mounting mat includes opposite facing major surfaces where at least one of the surfaces has a reinforcing coating applied thereto. The reinforcing coating imparts crack resistance to the mounting mat. The reinforcing coating is applied to the mounting mat in an amount to impart crack resistance, while still providing the desired thermal insulation properties, friction, and holding pressure performance across a wide temperature range. That is, the reinforcing coating imparts crack resistance without substantially altering or affecting the performance properties of the properties of the mounting mat.

A device for treating exhaust gases is also provided. The device includes an outer metallic housing, at least one fragile structure that is mounted within the housing by a mounting mat that is disposed between the inner surface of the housing and the outer surface of the fragile structure. The term "fragile structure" is intended to mean and include structures such as metal or ceramic monoliths or the like which may be fragile or frangible in nature, and would benefit from a mounting mat such as is described herein.

Catalyst structures generally include one or more porous tubular or honeycomb-like structures mounted by a thermally resistant material within a housing. Each structure includes anywhere from about 200 to about 900 or more channels or cells per square inch, depending upon the type of exhaust treating device. A diesel particulate trap differs from a catalyst structure in that each channel or cell within the particulate trap is closed at one end or the other. Particulate is collected from exhaust gases in the porous structure until regenerated by a high temperature burnout process. Non-automotive applications for the mounting mat may include catalytic converters for industrial emission (exhaust) stacks such as those used in chemical plants.

Figure 1:
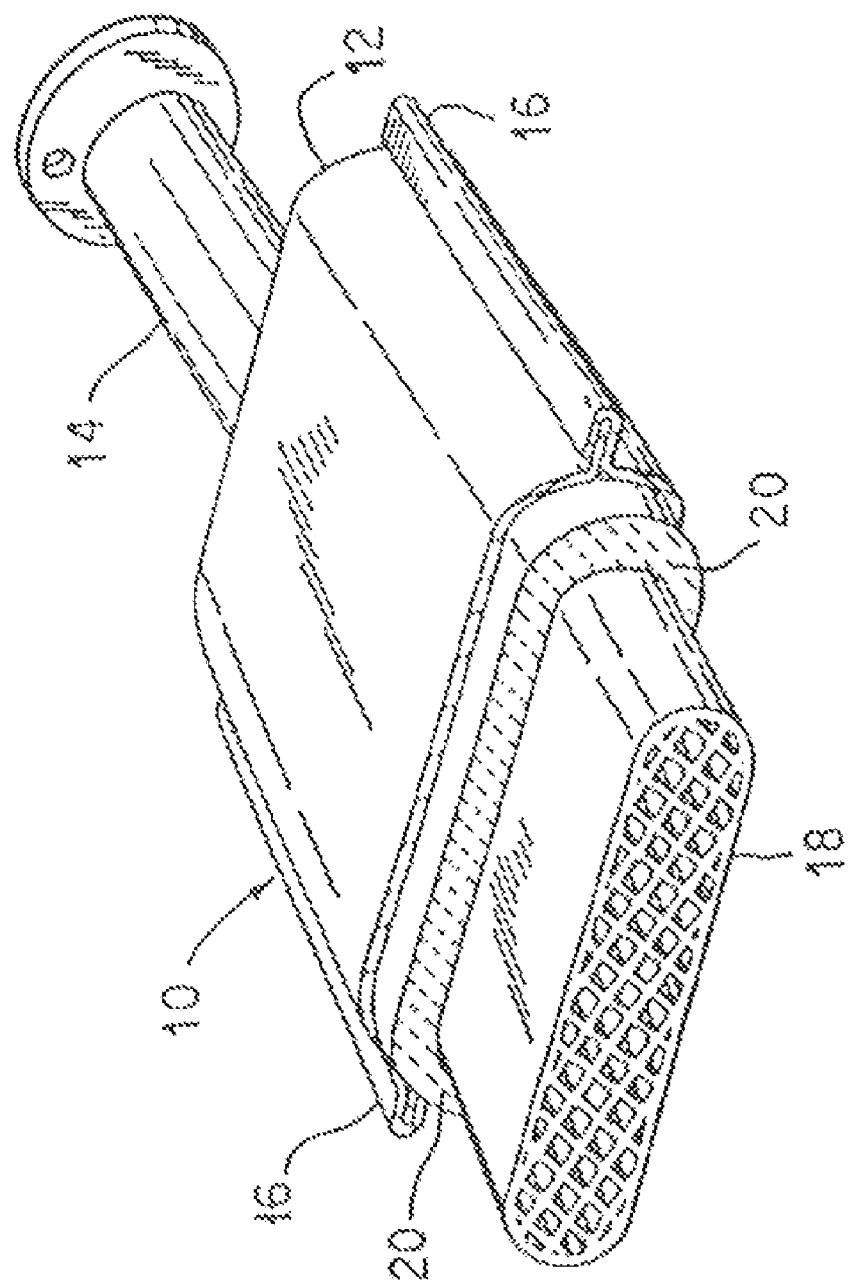
FIG. 1 shows a fragmentary, elevational view of a catalytic converter containing a mounting mat according to the present invention.

One illustrative form of a device for treating exhaust gases is designated by the numeral 10 in FIG. 1. It should be understood that the mounting mat is not intended to be limited to use in the device shown in FIG. 1, and so the shape is shown only as an illustrative embodiment. In fact, the mounting mat could be used to mount or support any fragile structure suitable for treating exhaust gases, such as a diesel catalyst structure, a diesel particulate trap, or the like.

Catalytic converter 10 may include a generally tubular housing 12 formed of two pieces of metal, for example, high temperature resistant steel, held together by flange 16. Alternatively, the housing may include a preformed canister into which a mounting mat-wrapped fragile structure is inserted. Housing 12 includes an inlet 14 at one end and an outlet (not shown) at its opposite end. The inlet 14 and outlet are suitably formed at their outer ends whereby they may be secured to conduits in the exhaust system of an internal combustion engine. Device 10 contains a fragile structure, such as a frangible ceramic monolith 18, which is supported and restrained within housing 12 by a mounting mat 20. Monolith 18 includes a plurality of gas pervious passages that extend axially from its inlet end surface at one end to its outlet end surface at its opposite end. Monolith 18 may be constructed of any suitable refractory metal or ceramic material in any known manner and configuration. Monoliths are typically oval or round in cross-sectional configuration, but other shapes are possible.

The monolith is spaced from inner surfaces of the housing by a distance or a gap, which may vary according to the type and design of the device utilized, for example, a catalytic converter, a diesel catalyst structure, or a diesel particulate trap. This gap is filled with a mounting mat 20 to provide resilient support to the ceramic monolith 18. The resilient mounting mat 20 provides both thermal insulation to the external environment and mechanical support to the fragile structure, thereby protecting the fragile structure from mechanical shock across a wide range of exhaust gas treatment device operating temperatures.

In general, the mounting mat includes inorganic fibers, optionally intumescent material, and binder. The composition of the mounting mat 20 is sufficient to provide a holding pressure capability to resiliently hold the fragile catalyst support structure 18 within a housing 12 of an exhaust gas treatment device 10 throughout a wide temperature range.

Any heat resistant inorganic fibers may be utilized in the mounting mat so long as the fibers can withstand the mounting mat forming process, can withstand the operating temperatures of the exhaust gas treatment devices, and provide the minimum holding pressure performance for holding fragile structure within the exhaust gas treatment device housing at the operating temperatures. Without limitation, suitable inorganic fibers that may be used to prepare the mounting mat and exhaust gas treatment device include high alumina polycrystalline fibers, refractory ceramic fibers such as aluminosilicate fibers, alumina-magnesia-silica fibers, kaolin fibers, alkaline earth silicate fibers such as calcia-magnesia-silica fibers and magnesia-silica fibers, S-glass fibers, S2-glass fibers, E-glass fibers, quartz fibers, silica fibers and combinations thereof.

According to certain embodiments, the heat resistant inorganic fibers that are used to prepare the mounting mat comprise ceramic fibers. Without limitation, suitable ceramic fibers include alumina fibers, alumina-silica fibers, alumina-zirconia-silica fibers, zirconia-silica fibers, zirconia fibers and similar fibers. A useful alumina-silica ceramic fiber is commercially available from Unifrax I LLC (Niagara Falls, N.Y.) under the registered trademark FIBERFRAX. The FIBERFRAX ceramic fibers comprise the fiberization product of about 45 to about 75 weight percent alumina and about 25 to about 55 weight percent silica. The FIBERFRAX fibers exhibit operating temperatures of up to about 1540° C. and a melting point up to about 1870° C. The FIBERFRAX fibers are easily formed into high temperature resistant sheets and papers.

The alumina/silica fiber may comprise from about 40 weight percent to about 60 weight percent $Al_2O_3$ and about 60 weight percent to about 40 weight percent $SiO_2$. The fiber may comprise about 50 weight percent $Al_2O_3$ and about 50 weight percent $SiO_2$. The alumina/silica/magnesia glass fiber typically comprises from about 64 weight percent to about 66 weight percent $SiO_2$, from about 24 weight percent to about 25 weight percent $Al_2O_3$, and from about 9 weight percent to about 10 weight percent MgO. The E-glass fiber typically comprises from about 52 weight percent to about 56 weight percent $SiO_2$, from about 16 weight percent to about 25 weight percent CaO, from about 12 weight percent to about 16 weight percent $Al_2O_3$, from about 5 weight percent to about 10 weight percent $B_2O_3$, up to about 5 weight percent MgO, up to about 2 weight percent of sodium oxide and potassium oxide and trace amounts of iron oxide and fluorides, with a typical composition of 55 weight percent $SiO_2$, 15 weight percent $Al_2O_3$, 7 weight percent $B_2O_3$, 3 weight percent MgO, 19 weight percent CaO and traces of the above mentioned materials.

Without limitation, suitable examples of biosoluble alkaline earth silicate fibers that can be used to prepare a mounting mat for an exhaust gas treatment device include those fibers disclosed in U.S. Pat. Nos. 6,953,757, 6,030,910, 6,025,288, 5,874,375, 5,585,312, 5,332,699, 5,714,421, 7,259,118, 7,153,796, 6,861,381, 5,955,389, 5,928,075, 5,821,183, and 5,811,360, which are incorporated herein by reference.

According to certain embodiments, the biosoluble alkaline earth silicate fibers may comprise the fiberization product of a mixture of oxides of magnesium and silica. These fibers are commonly referred to as magnesium-silicate fibers. The magnesium-silicate fibers generally comprise the fiberization product of about 60 to about 90 weight percent silica, from greater than 0 to about 35 weight percent magnesia and 5 weight percent or less impurities. According to certain embodiments, the heat treated alkaline earth silicate fibers comprise the fiberization product of about 65 to about 86 weight percent silica, about 14 to about 35 weight percent magnesia and 5 weight percent or less impurities. According to other embodiments, the heat treated alkaline earth silicate fibers comprise the fiberization product of about 70 to about 86 weight percent silica, about 14 to about 30 weight percent magnesia, and 5 weight percent or less impurities. A suitable magnesium-silicate fiber is commercially available from Unifrax I LLC (Niagara Falls, N.Y.) under the registered trademark ISOFRAX. Commercially available ISOFRAX fibers generally comprise the fiberization product of about 70 to about 80 weight percent silica, about 18 to about 27 weight percent magnesia and 4 weight percent or less impurities.

According to certain embodiments, the biosoluble alkaline earth silicate fibers may comprise the fiberization product of a mixture of oxides of calcium, magnesium and silica. These fibers are commonly referred to as calcia-magnesia-silica fibers. According to certain embodiments, the calcia-magnesia-silica fibers comprise the fiberization product of about 45 to about 90 weight percent silica, from greater than 0 to about 45 weight percent calcia, from greater than 0 to about 35 weight percent magnesia, and 10 weight percent or less impurities. Useful calcia-magnesia-silicate fibers are commercially available from Unifrax I LLC (Niagara Falls, N.Y.) under the registered trademark INSULFRAX. INSULFRAX fibers generally comprise the fiberization product of about 61 to about 67 weight percent silica, from about 27 to about 33 weight percent calcia, and from about 2 to about 7 weight percent magnesia. Other suitable calcia-magnesia-silicate fibers are commercially available from Thermal Ceramics (Augusta, Ga.) under the trade designations SUPERWOOL 607, SUPERWOOL 607 MAX and SUPERWOOL HT. SUPERWOOL 607 fibers comprise about 60 to about 70 weight percent silica, from about 25 to about 35 weight percent calcia, from about 4 to about 7 weight percent magnesia, and trace amounts of alumina. SUPERWOOL 607 MAX fibers comprise about 60 to about 70 weight percent silica, from about 16 to about 22 weight percent calcia, and from about 12 to about 19 weight percent magnesia, and trace amounts of alumina. SUPERWOOL HT fiber comprise about 74 weight percent silica, about 24 weight percent calcia and trace amounts of magnesia, alumina and iron oxide.

Suitable silica fibers useful in the production of a mounting mat for an exhaust gas treatment device include those leached glass fibers available from BelChem Fiber Materials GmbH, Germany, under the trademark BELCOTEX, from Hitco Carbon Composites, Inc. of Gardena Calif., under the registered trademark REFRASIL, and from Polotsk-Steklovolokno, Republic of Belarus, under the designation PS-23(R).

The BELCOTEX fibers are standard type, staple fiber pre-yarns. These fibers have an average fineness of about 550 tex and are generally made from silicic acid modified by alumina. The BELCOTEX fibers are amorphous and generally contain about 94.5 silica, about 4.5 percent alumina, less than 0.5 percent sodium oxide, and less than 0.5 percent of other components. These fibers have an average fiber diameter of about 9 microns and a melting point in the range of 1500° to 1550° C. These fibers are heat resistant to temperatures of up to 1100° C., and are typically shot free and binder free.

The REFRASIL fibers, like the BELCOTEX fibers, are amorphous leached glass fibers which have a high silica content for providing thermal insulation for applications in the 1000° to 1100° C. temperature range. These fibers are between about 6 and about 13 microns in diameter, and have a melting point of about 1700° C. The fibers, after leaching, typically have a silica content of about 95 percent by weight. Alumina may be present in an amount of about 4% by weight with other components being present in an amount of 1% or less.

The PS-23 (R) fibers from Polotsk-Steklovolokno are amorphous glass fibers high in silica content and are suitable for thermal insulation for applications requiring resistance to at least about 1000° C. These fibers have a fiber length in the range of about 5 to about 20 mm and a fiber diameter of about 9 microns. These fibers, like the REFRASIL fibers, have a melting point of about 1700° C.

The intumescent material that may be incorporated into the mounting mat includes, without limitation, unexpanded vermiculite, ion-exchanged vermiculite, heat treated vermiculite, expandable graphite, hydrobiotite, water-swelling tetrasilicic flourine mica, alkaline metal silicates, or mixtures thereof. The mounting mat may include a mixture of more than on type of intumescent material. The intumescent material may comprise a mixture of unexpanded vermiculite and expandable graphite in a relative amount of about 9:1 to about 1:2 vermiculite:graphite, as described in U.S. Pat. No. 5,384,188.

The mounting mat also includes a binder or mixture of more than one type of binder. Suitable binders include organic binders, inorganic binders and mixtures of these two types of binders. According to certain embodiments, the intumescent mounting mat, includes one or more organic binders. The organic binders may be provided as a solid, a liquid, a solution, a dispersion, a latex, an emulsion, or similar form. The organic binder may comprise a thermoplastic or thermoset binder, which after cure is a flexible material that can be burned out of an installed mounting mat. Examples of suitable organic binders include, but are not limited to, acrylic latex, (meth)acrylic latex, copolymers of styrene and butadiene, vinylpyridine, acrylonitrile, copolymers of acrylonitrile and styrene, vinyl chloride, polyurethane, copolymers of vinyl acetate and ethylene, polyamides, silicones, and the like. Other resins include low temperature, flexible thermosetting resins such as unsaturated polyesters, epoxy resins and polyvinyl esters.

The organic binder may be included in the mounting mat in an amount of greater than 0 to about 20 weight percent, from about 2.5 to about 15 weight percent, from about 5 to about 12.5 weight percent or from about 7.5 to about 10 weight percent, based on the total weight of the mounting mat.

The mounting mat may include polymeric binder fibers instead of, or in addition to, a resinous or liquid binder. These polymeric binder fibers may be used in amounts to aid in binding the heat resistant inorganic fibers together. Suitable examples of binder fibers include polyvinyl alcohol fibers, polyolefin fibers such as polyethylene and polypropylene, acrylic fibers, polyester fibers, ethyl vinyl acetate fibers, nylon fibers and combinations thereof.

Typically, the organic binder is a sacrificial binder employed to initially bond the fibers together. By "sacrificial," it is meant that the organic binder will eventually be burned out of the mounting mat, leaving only the inorganic fibers, optionally intumescent material and optionally clay as the mounting mat for supporting the fragile structure within the metallic housing.

In addition to organic binders, the mounting mats may also include inorganic binder material. Without limitation, suitable inorganic binder materials include colloidal dispersions of alumina, silica, zirconia, and mixtures thereof.

The mounting mat may be produced in any way known in the art for forming sheet-like materials. For example, conventional paper-making processes, either hand laid or machine laid, may be used to prepare the intumescent sheet material. A handsheet mold, a Fourdrinier paper machine, or a rotoformer paper machine can be employed to make the intumescent sheet material.

For example, using a papermaking process, the inorganic fibers, intumescent material, and antioxidant may be mixed together with a binder or other fibers capable of acting as a binder to form a mixture or slurry. The slurry of components may be flocculated by adding a flocculating agent to the slurry. The flocculated mixture or slurry is placed onto a papermaking machine to be formed into a ply or sheet of fiber containing paper. The sheet is dried by air drying or oven drying. For a more detailed description of standard papermaking techniques employed, see U.S. Pat. No. 3,458,329, the disclosure of which is incorporated herein by reference.

Alternatively, the plies or sheets may be formed by vacuum casting the slurry. According to this method, the slurry of components is wet laid onto a pervious web. A vacuum is applied to the web to extract the majority of the moisture from the slurry, thereby forming a wet sheet. The wet plies or sheets are then dried, typically in an oven. The sheet may be passed through a set of rollers to compress the sheet prior to drying.

In other embodiments, the fibers may be processed into a mounting mat by conventional means such as dry air layering. The mat at this stage has very little structural integrity and is very thick relative to conventional catalytic converter and diesel trap mounting mats. The resultant mat can therefore be dry needled, as is commonly known in the art, to densify the mat and increase its strength.

Where the dry air layering technique is used, the mat may be alternatively processed by the addition of a binder to the mat by impregnation to form a discontinuous fiber composite. In this technique, the binder is added after formation of the mat, rather than forming the mat prepreg as noted hereinabove with respect to the conventional papermaking technique. This method of preparing the mat aids in maintaining fiber length by reducing breakage.

A reinforcing coating is applied to a surface of the mounting mat. According to certain embodiments, the reinforcing coating is applied to one of the major surfaces of the mounting mat. According to other embodiments, the reinforcing coating may be applied to both major surfaces. The reinforcing coating may be applied in either a continuous or discontinuous patterns. According to certain illustrative embodiments, the reinforcing coating is applied in a continuous fashion on one or both major surfaces of the mounting mat. The continuous coating is applied to the surface of the mounting mat in a substantially uniform manner across the entire surface of the mounting mat.

The reinforcing coating that is applied to one or both major surfaces of the mounting mat generally comprises an organic material. The organic material of the reinforcing coating is separate than the sacrificial organic binder material that is included within the mounting mat. According to certain illustrative embodiments, the reinforcing coating comprises an organic latex. Organic latex that may be used as the reinforcing layer comprises an acrylic latex. Without limitation, a suitable acrylic latex that may be used as the reinforcing coating is commercially available from (Lubrizol Advanced Materials, Inc.; Cleveland, Ohio, USA) under the trade designation HYCAR26083.

The reinforcing coating is applied to the mounting mat in an amount sufficient to increase the crack resistance of the mounting mat as compared to the same mounting mat without the reinforcing coating. While the reinforcing coating is applied to the mounting mat in an amount sufficient to increase the crack resistance of the mat, the presence of the reinforcing coating does not appreciably alter or affect the performance properties of the mounting mat (ie, holding pressure performance, cold friction, cold compression, etc). The reinforcing coating comprising the acrylic latex is applied to the mounting mat in an amount from about 0.01 to about 2 weight percent based on the dry weight of the mounting mat. Without limitation, and merely by way of illustration, the acrylic latex is applied to the mounting mat at an amount of about 0.25 weight percent based on the total dry weight of said mounting mat.

The reinforcing coating may also include a suitable antioxidant additive. Suitable examples of antioxidant materials include primary antioxidants, secondary antioxidants, multifunctional antioxidants, and combinations thereof. Without limitation, non-limiting examples of primary antioxidants include sterically hindered phenolics and secondary aromatic amines. Suitable sterically hindered phenolics are commercially available from Elikochern (Villejust, France) under the trade designation Wingstay, from RT Vanderbilt (Norwalk Conn.) under the trade designations Agerite Resin and Vanox, and from Ciba Specialty Chemicals (High Point, N.C.) under the trade designation Irganox.

Suitable examples of secondary antioxidants include organophosphorus compounds which decompose peroxides and hydroperoxides into stable, non-radical products and thiosynergists which are very efficient for long-term thermal aging applications. Multifunctional antioxidants optimally combine primary and secondary antioxidant functions in one antioxidant compound. According to certain embodiments, blends of hindered phenolics and thiosynergist antioxidants may be used as the antioxidant material for the exhaust gas treatment device mounting mat.

The antioxidant material may be provided in the form of dispersions or emulsions of primary or mixtures of primary and secondary antioxidants. Suitable antioxidant dispersions are commercially available from Akron Dispersions (Akron, Ohio) under the trade designation Bostex, from Aquaspersions (West Yorkshire, UK) under the trade designation Aquanox, from Tiarco Chemical (Dalton, Ga.) under the trade designation Octolite, and from Great Lakes Chemical Co. (Indianapolis, Ind.) under the trade designations Lowinx, Durad and Anox.

Illustrative examples of antioxidant dispersions include Bostex 24, which is a dispersion of Wingstay L and Bostex 362A, which is 50% Wingstay L/DTDTDP synergist (a thiosynergist/secondary antioxidant). The thermal degradation temperature for Wingstay L (the antioxidant contained in the Bostex 362A dispersion) is greater than about 300° C. and the autoignition temperature is about 440° C.

A particularly suitable antioxidant is commercially available from Akron Dispersions (Akron, Ohio) under the trade designation Bostex 362A. According to certain illustrative embodiments, the antioxidant material is pre-complexed with the organic binder material prior to addition to the remaining components of the mounting mat.

The reinforcing coating material may also include a coating detection additive. Without limitation the coating detection additive comprises an ultra-violet light detectable dye. The ultra-violet light detectable dye may be included in the reinforcing coating composition in an amount from about 0.01 to about 0.5 weight percent based on the dry weight of the mounting mat. According to certain illustrative embodiments, the ultra-violet light detectable dye is present in an amount of about 0.03 weight percent based on the total weight of said mounting mat.

The flexible reinforcing coating may be applied to the one or more major surfaces of the mounting mat by one of brushing, dipping, immersing, or spraying. Without preference or limitation, the flexible reinforcing coating may be applied to the one or more major surfaces of the mounting mat by a spray coating process. The spray coating process involves the use of a plurality of spray nozzles to provide a light, but uniform reinforcing coating across the surface(s) of the mounting mat. The spray coating process permits the application of a very light coating of the reinforcing coating, such as an acrylic latex, to the surfaces of the mounting mat. The layer of reinforcing coating is applied in an amount that does not appreciably alter or compromise the thermal insulation, the holding pressure performance, the cold compression performance, and the cold friction performance of the mounting mat. However, the reinforcing coating is applied at a level to impart substantial crack resistance to the mounting mat. Thus, neither the total binder content or the thickness of the mounting mat are substantially increased.

The mounting mat may comprise one or more layers. The mounting mat may comprise one non-intumescent layer or one intumescent layer. Alternatively, the mounting mat may comprise multiple layers comprising more than one non-intumescent layer or more than one intumescent layer. Additionally, the mounting mat may comprise multiple layers comprising a combination of at least one non-intumescent layer and at least one intumescent layer. Further embodiments of the mounting mat may comprise multiple layers comprising at least one intumescent layer that is sandwiched between at least two non-intumescent layers. Further embodiments of the mounting mat may comprise multiple layers comprising at least one non-intumescent layer sandwiched between at least two intumescent layers. For mounting mats comprised of multiple layers, the reinforcing coating layer may be applied to one or more of the major surfaces of only one of the layers of the mounting. Alternatively, the reinforcing coating layer may be applied to one or more of the major surfaces of more than one of the layers of the mounting mat composite. According to certain embodiments, the reinforcing coating layer may be applied to one or more of the major surfaces of each of the layers of the composite mounting mat.

The coated mounting mat can be cut, such as by die stamping, to form mounting mats of exact shapes and sizes with reproducible tolerances. The mounting mat 20 exhibits suitable handling properties upon densification as by needling or the like, meaning it can be easily handled and is not so brittle as to crumble in one's hand like many other fiber blankets or mats. It can be easily and flexibly fitted or wrapped around the fragile structure 18 or like fragile structure without cracking, and then disposed within the catalytic converter housing 12. Generally, the mounting mat-wrapped fragile structure can be inserted into a housing or the housing can be built or otherwise fabricated around the mounting mat-wrapped fragile structure.

EXPERIMENTAL

The following examples are set forth merely to further illustrate the effect of the treatment of the surfaces of a mounting mat with a reinforcing coating. The illustrative examples should not be construed as limiting the mounting mat, exhaust gas treatment device incorporating the mounting mat, or the methods of making the mounting mat or the exhaust gas treatment device in any manner.

A sample reinforcing coating was prepared with 95% water, 4.5% HYCAR 26083 acrylic latex, and 0.5% BOS-TEX 362A antioxidant. A layer of the reinforcing coating (0.25% of mat weight) was spray coated onto the mat to substantially increase the crack resistance. A 0.03% level of UV dye was included in the acrylic latex so that a determination of amount coated could be made using a UV detector. The mat used for the testing was a sample of an intumescent exhaust gas treatment devices mounting mat commercially available under the registered trademark ISOMAT® AV5 from Unifrax I LLC (Niagara Falls, N.Y., USA). The sample mats are comprised of biosoluble inorganic fibers, vermiculite and sacrificial organic binder, and has a basis weight of about 2900 g/m².

A load that is capable of exerting a maximum force of 250N was used in the evaluation. The force (in Newtons) needed to crack coated and uncoated mounting mats are set forth below in Table I:

TABLE I

| Example | Coating | No Coating |
|---------|---------|------------|
| 1 | 250 | 4 |
| 2 | 250 | 4 |
| 3 | 250 | 17 |
| 4 | 250 | 2 |
| 5 | 250 | 5 |
| 6 | 250 | 4 |
| 7 | 250 | 5 |
| 8 | 250 | 4 |
| 9 | 250 | 2 |
| 10 | 250 | 15 |
| 11 | 250 | 6 |
| 12 | 250 | 15 |
| 13 | 250 | 9 |
| 14 | 250 | 3 |

As shown in Table I, above, the force (in Newtons) to crack the uncoated mat was from 2 to 17 N. However, with the application of the acrylic latex-based reinforcing coating to the mounting mat, the amount of force required to crack the mounting mat was at least 250 N. Therefore, the reinforcing coating layer imparted a substantial crack resistance as compared to uncoated mats of identical composition.

The holding pressure, cold compression and cold friction performance of intumescent mounting mats having a reinforcing coating thereon were evaluated and compared to mounting mats without the application of such a coating.

To evaluate the holding pressure performance of the mounting mats, intumescent mounting mats with and without the application of a reinforcing coating were subjected to mechanical cycling. The test mats were placed between two heated blocks. The two blocks are heated to different temperatures as shown in Table II. The top heated block is moved to open the gap by either 1% or 3% of the initial gap width and then closed over a given period of time wherein the gap was opened (a "cycle"). After 1000 cycles, the residual minimum holding pressure exerted by the mounting mat was calculated. The results of the mechanical cycling tests are set forth in Table II below:

TABLE II

| Sample | Pmin 1000<br>0.50 gbd<br>400/200° C. | Pmin 1000<br>0.50 gbd<br>800/400° C. |
|---|---|---|
| Target | >50 kPa | >50 kPa |
| C1 (no coating) | 55 | 60.1 |
| 2 (coating) | 54.2 | 59.7 |

As can be seen, the mounting mats having the crack resistant coating applied thereon achieve a Pmin 1000 of greater than 50 kPa as tested. The holding pressure performance of the mounting mat having a reinforcing coating applied thereon was virtually identical to the performance of the mounting mats without the reinforcing coating. These results indicate that the inclusion of a reinforcing coating improves crack resistance without sacrificing holding pressure performance.

Another excellent indicator of the holding pressure performance of the mounting mats is the push-out force. The push-out force is a measure of the amount of force required to push the fragile catalyst support structure or substrate (ie, the monolith) out of the exhaust gas treatment device outer housing. To perform the test, the exhaust gas treatment device is assembled by positioning the mounting mat around the fragile catalyst support structure and locating the fragile catalyst support structure within the housing with the mounting mat disposed in the gap between the fragile catalyst support structure and the outer steel housing. For this test, the fragile catalyst support structures were wrapped with the mounting mat and installed in the outer steel housing a commonly performed canning technique known as tourniquet mounting. The housing used on this test was stainless steel SS409 housing. The fragile catalyst support structure was then pushed out of the housing mechanical testing equipment, such as the Instron or MTS. The amount of force needed to push the fragile catalyst support structure out of the outer steel housing was recorded. This test was performed on a mounting mat that was treated with the reinforcing coating on the interior shell or housing side of an exhaust gas treatment device, on the substrate side of the fragile structure, and on a mounting mat that was not treated with the reinforcing coating. The results of this testing are set forth in Table III below.

TABLE III

| Sample | Coating | Coated Side | Gap (mm) | Gap Bulk Density (g/cm³) | Push-Out Force (N) |
|---|---|---|---|---|---|
| 1 | Yes | Interior shell | 4.32 | 0.66 | 4060 |
| 2 | Yes | Substrate side | 4.26 | 0.67 | 4247 |
| 3 | No | Not Coated | 4.44 | 0.65 | 4202 |

As shown in Table III above, mounting mats that were coated on either the interior shell side or the substrate side with the reinforcing coating exhibited push-out force values which were comparable to that of the mounting mat which was not coated with the reinforcing coating. Therefore, mounting mats treated with the reinforcing coating possess similar values for holding pressure performance as those mats not treated with the reinforcing coating. These results further indicate that the inclusion of a reinforcing coating improves crack resistance without sacrificing holding pressure performance.

To evaluate the cold compression performance of the mounting mats, intumescent mounting mats with and without the reinforcing coating were cut into 2 inch by 2 inch samples. The basis weight of the samples was measured and recorded. A sample of mat was placed between two plates and was held at room temperature. A target gap was calculated based on the target gap bulk density of the mat being tested. The top plate of the test apparatus was lowered at 25.4 mm/minute until the target gap was reached. The peak pressure once the target gap was reached was measured. The mat was held at the target gap for 300 seconds and the residual pressure was measured.

The results of the cold compression tests are set forth in Table IV below:

TABLE IV

| Sample | Cold Compression<br>0.5 gbd | Cold Compression Peak<br>0.75 gbd |
|---|---|---|
| Target | >125 kPa | <1600 kPa |
| C1 (no coating) | 153 | 1240 |
| 2 (coating) | 147 | 1232 |

As shown in Table IV, cold pressure performance of the mounting mat having a reinforcing coating applied thereon was very similar to the cold pressure performance of the mounting mats without the reinforcing coating. These results indicate that the inclusion of a reinforcing coating improves crack resistance without sacrificing cold pressure performance.

To evaluate the cold friction performance of the mounting mats, intumescent mounting mats with and without the reinforcing coating were cut into 2 inch by 2 inch samples. The weights of the mat samples were measured and recorded. A pair of mat samples were aligned with a piece of stainless steel plate located between them, and this assembly was placed in a vise. The vise was closed with enough force to reach the target gap bulk density, and the peak load was recorded. After a 5 minute period, the residual load was measured and recorded. The stainless steel plate was pushed down between the mat samples and the force exerted during this displacement was recorded. The results of the cold friction tests are set forth in Table V below:

TABLE V

| Sample | Cold Friction Steel<br>0.5 gbd | Cold Friction Steel<br>0.75 gbd |
|---|---|---|
| C1 (no coating) | 0.257 | 0.25 |
| 2 (coating) | 0.265 | 0.241 |

As shown in Table V, cold friction performance of the mounting mat having a reinforcing coating applied thereon was very similar to the cold friction performance of the mounting mats without the reinforcing coating. These results indicate that the inclusion of a reinforcing coating improves crack resistance without sacrificing cold friction performance.

From the results shown in Tables I-V, the inclusion of a reinforcing coating on a surface of the mounting mat provides a very flexible mounting mat and improves the crack resistance of the mounting mat, without substantially affecting or altering the performance properties of the mounting mat.

Figure 2:
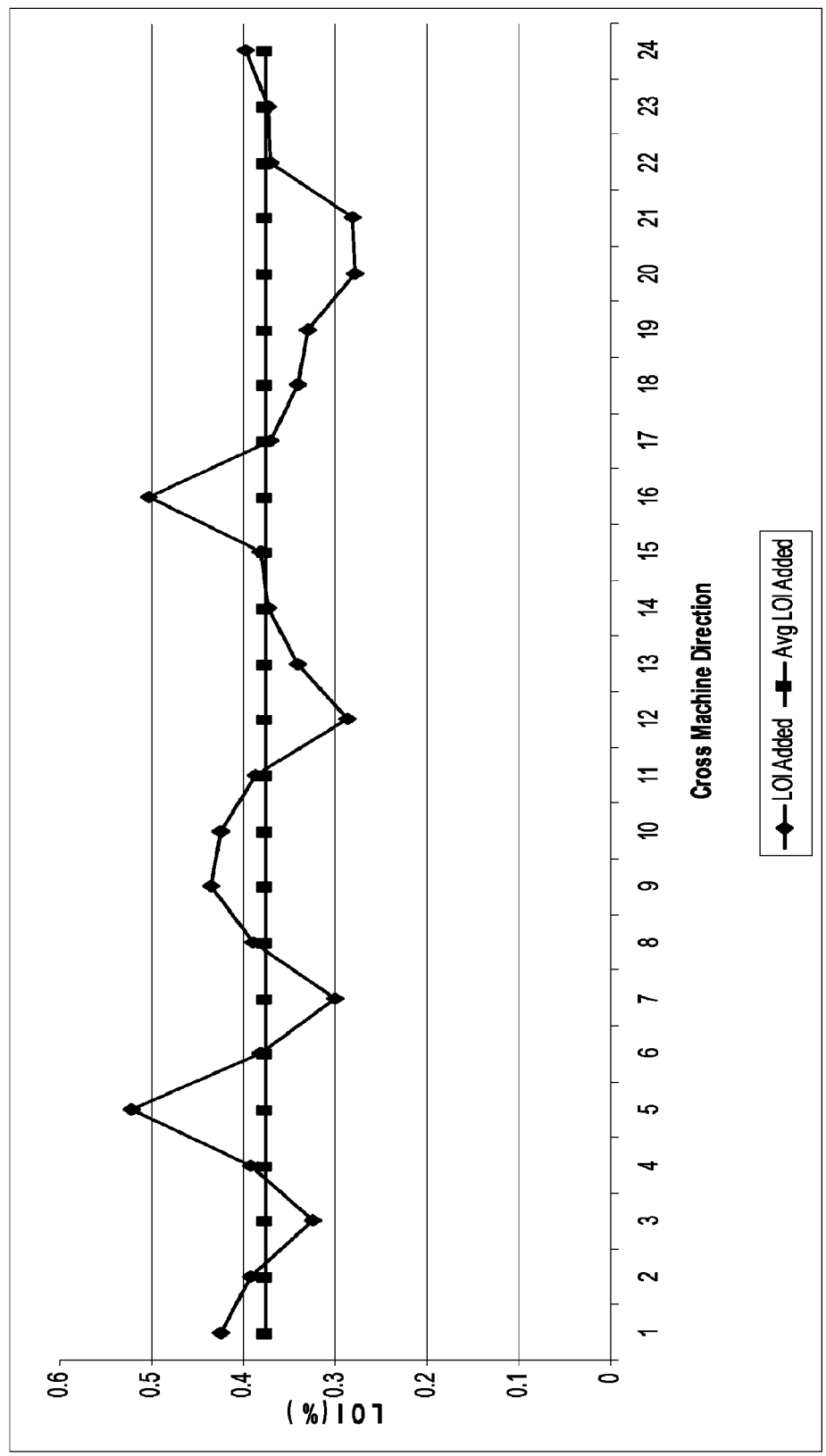
FIG. 2 is a graph showing the distribution of reinforcing coating applied to an inorganic fibrous mounting mat.

The distribution of reinforcing coating on the surface of an inorganic fibrous mounting mat was evaluated. A tray having the dimensions of about 15 inches long by about 60 inches wide was divided into a plurality of substantially equal size compartments. An approximately 2 inch by 2 inch piece of commercially available exhaust gas treatment device mounting mat comprising inorganic fibers and no organic binder sold by Unifrax I LLC (Niagara Falls, N.Y., USA) under the trade designation CC-MAX 8 HP ase weighed and placed within each compartment of the tray. The tray was placed on a coating machine in a position that would be occupied by a mounting mat during normal commercial to production. The coating system was turned on and the reinforcing coating comprising an organic latex was applied to the surfaces of the mounting mat pieces located within the tray for a known length of time. The amount and distribution of the reinforcing latex coating applied to the mounting mat pieces was determined. The amount of the reinforcing latex coating is reported in FIG. 2 as LOI Added and the distribution of the reinforcing latex coating across all of the pieces of mounting mat within the tray is reported as Avg. LOI Added.

The mounting mats can be die cut and are operable as resilient supports in a thin profile, providing ease of handling, and in a flexible form, so as to be able to provide a total wrap of the catalyst support structure, if desired, without cracking. Alternatively, the mounting mat may be integrally wrapped about the entire circumference or perimeter of at least a portion of the catalyst support structure. The mounting mat may also be partially wrapped and include an end-seal as currently used in some conventional converter devices, if desired, to prevent gas by-pass.

The mounting mats described above are also useful in a variety of applications such as conventional automotive catalytic converters for, among others, motorcycles and other small engine machines, and automotive pre-converters, as well as high temperature spacers, gaskets, and even future generation automotive underbody catalytic converter systems.

The mounting mats described above can also be used in catalytic converters employed in the chemical industry which are located within exhaust or emission stacks, including those which contain fragile honeycomb type structures that need to be protectively mounted.

While the mounting mat and exhaust gas treatment device have been described in connection with various illustrative embodiments, it is to be understood that other similar embodiments may be used or modifications and additions may be made to the described embodiments for performing the same to function disclosed herein without deviating therefrom. The embodiments described above are not necessarily in the alternative, as various embodiments may be combined to provide the desired characteristics. Therefore, the mounting mat and exhaust gas treatment device should not be limited to any single embodiment, but rather construed in breadth and scope in accordance with the recitation of the appended claims.

The invention claimed is:

1. A substantially crack resistant mounting mat for an exhaust gas treatment device comprising:
   at least one layer having opposite facing major surfaces; and
   a reinforcing coating layer applied to at least a portion of at least one of said major surfaces,
   wherein the reinforcing coating layer does not substantially affect the performance properties of the mounting mat and increases the crack resistance of the mounting mat as compared to the same mounting mat without the reinforcing coating layer.

2. The mounting mat of claim 1, wherein said layer comprises inorganic fibers.

3. The mounting mat of claim 2, wherein said inorganic fibers are selected from the group consisting of high alumina polycrystalline fibers, ceramic fibers, mullite fibers, glass fibers, biosoluble fibers, quartz fibers, silica fibers, and mixtures thereof.

4. The mounting mat of claim 3, wherein the high alumina polycrystalline fibers comprise the fiberization product of about 72 to about 100 weight percent alumina and about 0 to about 28 weight percent silica.

5. The mounting mat of claim 3, wherein the ceramic fibers comprise alumino-silicate fibers comprising the fiberization product of about 45 to about 72 weight percent alumina and about 28 to about 55 weight percent silica.

6. The mounting mat of claim 3, wherein the biosoluble fibers comprise magnesia-silica fibers comprising the fiberization product of about 65 to about 86 weight percent silica, from about 14 to about 35 weight percent magnesia and about 5 weight percent of less impurities.

7. The mounting mat of claim 6, wherein the magnesia-silica fibers comprise the fiberization product of about 70 to about 86 weight percent silica, about 14 to about 30 weight percent magnesia and about 5 weight percent or less impurities.

8. The mounting mat of claim 7, wherein the magnesia-silica fibers comprise the fiberization product of about 70 to about 80 weight percent silica, about 18 to about 27 weight percent magnesia and 0 to 4 weight percent impurities.

9. The mounting mat of claim 3, wherein the biosoluble fibers comprise calcia-magnesia-silica fibers comprising the fiberization product of about 45 to about 90 weight percent silica, greater than 0 to about 45 weight percent calcia, and greater than 0 to about 35 weight percent magnesia.

10. The mounting mat of claim 9, wherein the calcia-magnesia-silica fibers comprise the fiberization product of about 60 to about 70 weight percent silica, from about 16 to about 35 weight percent calcia, and from about 4 to about 19 weight percent magnesia.

11. The mounting mat of claim 10, wherein the calcia-magnesia-silica fibers comprise the fiberization product of about 61 to about 67 weight percent silica, from about 27 to about 33 weight percent calcia, and from about 2 to about 7 weight percent magnesia.

12. The mounting mat of claim 1, wherein said layer further comprises an intumescent material.

13. The mounting mat of claim 12, wherein the intumescent material is selected from the group consisting of unexpanded vermiculite, ion exchanged vermiculite, heat treated vermiculite, expandable graphite, hydrobiotite, water-swelling tetrasilicic flourine mica, alkaline metal silicates, or mixtures thereof.

14. The mounting mat of claim 13, wherein the intumescent material comprises unexpanded vermiculite.

15. The mounting mat of claim 1, wherein said reinforcing coating layer comprises an organic latex.

16. The mounting mat of claim 15, wherein said organic latex comprises an acrylic latex.

17. The mounting mat of claim 16, wherein said acrylic latex is applied to said mounting mat in an amount from about 0.01 to about 2 weight percent based on the dry weight of the mounting mat.

18. The mounting mat of claim 17, wherein said acrylic latex is applied to said mounting mat in an amount of about 0.25 weight percent based on the total dry weight of said mounting mat.

19. The mounting mat of claim 1, wherein said reinforcing coating layer is applied as a continuous coating to at least one major surface of said mounting mat.

20. The mounting mat of claim 1, wherein said continuous coating is substantially uniform across said major surface of said mounting mat.

21. The mounting mat of claim 1, wherein said reinforcing coating layer further comprises an ultra-violet light detectable dye in an amount from about 0.01 to about 0.5 weight percent based on the weight of the mounting mat.

22. The mounting mat of claim 21, wherein said ultra-violet light detectable dye is present in an amount of about 0.03 weight percent based on the total weight of said mounting mat.

23. The mounting mat of claim 1, wherein said reinforcing coating layer further comprises an antioxidant.

24. The mounting mat of claim 23, wherein said antioxidant is selected from the group consisting of primary antioxidants, secondary antioxidants, multifunctional antioxidants, and combinations thereof.

25. The mounting mat of claim 1, wherein said layer comprises at least two layers.

26. The mounting mat of claim 25, wherein said layer may comprise (a) at least one non-intumescent layer and at least one intumescent layer, or (b) at least two intumescent layers, or (c) at least two non-intumescent layers.

27. The mounting mat of claim 25 wherein said layer comprises an intumescent layer sandwiched between two non-intumescent layers.

28. The mounting at of claim 25, wherein said layer comprises a non-intumescent layer sandwiched between two intumescent layers.

29. An exhaust gas treatment device comprising:
a housing;
a fragile catalyst support structure mounted within said housing; and
a mounting mat disposed in a gap between said housing and said fragile catalyst support structure, wherein said mounting mat comprises an intumescent, non-intumescent or hybrid layer having opposite facing major surfaces and a reinforcing coating layer applied to at least a portion of at least one of said major surfaces, wherein the reinforcing coating layer does not substantially affect the performance properties of the mounting mat and increases the crack resistance of the mounting mat as compared to the same mounting mat without the reinforcing coating layer.

30. The exhaust gas treatment device of claim 29, wherein said mounting mat comprises inorganic fibers.

31. The exhaust gas treatment device of claim 30, wherein said inorganic fibers are selected from the group consisting of high alumina polycrystalline fibers, ceramic fibers, mullite fibers, glass fibers, biosoluble fibers, quartz fibers, silica fibers, and mixtures thereof.

32. The exhaust gas treatment device of claim 31, wherein the high alumina polycrystalline fibers comprise the fiberization product of about 72 to about 100 weight percent alumina and about 0 to about 28 weight percent silica.

33. The exhaust gas treatment device of claim 31, wherein the ceramic fibers comprise alumino-silicate fibers comprising the fiberization product of about 45 to about 72 weight percent alumina and about 28 to about 55 weight percent silica.

34. The exhaust gas treatment device of claim 31, wherein the biosoluble fibers comprise magnesia-silica fibers comprising the fiberization product of about 65 to about 86 weight percent silica, from about 14 to about 35 weight percent magnesia and about 5 weight percent of less impurities.

35. The exhaust gas treatment device of claim 34, wherein the magnesia-silica fibers comprise the fiberization product of about 70 to about 86 weight percent silica, about 14 to about 30 weight percent magnesia and about 5 weight percent or less impurities.

36. The exhaust gas treatment device of claim 35, wherein the magnesia-silica fibers comprise the fiberization product of about 70 to about 80 weight percent silica, about 18 to about 27 weight percent magnesia and 0 to 4 weight percent impurities.

37. The exhaust gas treatment device of claim 31, wherein the biosoluble fibers comprise calcia-magnesia-silica fibers comprising the fiberization product of about 45 to about 90 weight percent silica, greater than 0 to about 45 weight percent calcia, and greater than 0 to about 35 weight percent magnesia.

38. The exhaust gas treatment device of claim 37, wherein the calcia-magnesia-silica fibers comprise the fiberization product of about 60 to about 70 weight percent silica, from about 16 to about 35 weight percent calcia, and from about 4 to about 19 weight percent magnesia.

39. The exhaust gas treatment device of claim 38, wherein the calcia-magnesia-silica fibers comprise the fiberization product of about 61 to about 67 weight percent silica, from about 27 to about 33 weight percent calcia, and from about 2 to about 7 weight percent magnesia.

40. The exhaust gas treatment device of claim 29, wherein said mounting mat is an intumescent mounting mat further comprising an intumescent material.

41. The exhaust gas treatment device of claim 40, wherein the intumescent material is selected from the group consisting of unexpanded vermiculite, ion exchanged vermiculite, heat treated vermiculite, expandable graphite, hydrobiotite, water-swelling tetrasilicic flourine mica, alkaline metal silicates, or mixtures thereof.

42. The exhaust gas treatment device of claim 41, wherein the intumescent material comprises unexpanded vermiculite.

43. The exhaust gas treatment device of claim 29, wherein said reinforcing coating layer comprises an organic latex.

44. The exhaust gas treatment device of claim 43, wherein said organic latex comprises an acrylic latex.

45. The exhaust gas treatment device of claim 44, wherein said acrylic latex is applied to said mounting mat in an amount from about 0.01 to about weight 2 percent based on the dry weight of the mounting mat.

46. The exhaust gas treatment device of claim 45, wherein said acrylic latex is applied to said mounting mat at an amount of about 0.25 weight percent based on the total dry weight of said mounting mat.

47. The exhaust gas treatment device of claim 29, wherein said reinforcing coating layer is applied as a continuous coating to a major surface of said mounting mat.

48. The exhaust gas treatment device of claim 47, wherein said continuous coating layer is substantially uniform across said surface of said mounting mat.

49. The exhaust gas treatment device of claim 29, wherein said reinforcing coating layer further comprises an ultra-violet light detectable dye in an amount from about 0.01 to about 0.5 weight percent based on the dry weight of the mounting mat.

50. The exhaust gas treatment device of claim 49, wherein said ultra-violet light detectable dye is present in an amount of about 0.03 weight percent based on the total weight of said mounting mat.

51. The exhaust gas treatment device of claim 50, wherein said reinforcing coating layer further comprises an antioxidant.

52. The exhaust gas treatment device of claim 51, wherein said antioxidant is selected from the group consisting of primary antioxidants, secondary antioxidants, multifunctional antioxidants, and combinations thereof.

53. The exhaust gas treatment device of claim 29, wherein the device is a catalytic converter or diesel particulate trap.

54. A method for making a mounting mat for holding a fragile catalyst support structure within the housing of an exhaust gas treatment device comprising:
   providing or preparing an intumescent, non-intumescent, or hybrid layer having opposite facing major surfaces; and
   applying a flexible reinforcing coating layer to at least a portion of at least one of said major surfaces of said intumescent or non-intumescent sheet layer, wherein the reinforcing coating layer does not substantially affect the performance properties of the mounting mat and increases the crack resistance of the mounting mat as compared to the same mounting mat without the reinforcing coating layer.

55. The method of claim 54, wherein said sheet layer comprises inorganic fibers and optionally an intumescent material.

56. The method of claim 54, wherein said flexible reinforcing coating layer is applied to said mounting mat by one of brushing, dipping, immersing, or spraying.

57. The method of claim 56, wherein said flexible reinforcing coating layer is applied to said mounting mat by spraying.

58. A method of making a device for treating exhaust gases comprising:
   wrapping an intumescent or non-intumescent layer having opposite facing major surfaces and a reinforcing coating layer applied to at least a portion of at least one of said major surfaces around a portion of a fragile catalyst support structure for treating exhaust gases, wherein the reinforcing coating layer does not substantially affect the performance properties of the mounting mat and increases the crack resistance of the mounting mat as compared to the same mounting mat without the reinforcing coating layer; and
   locating the wrapped fragile catalyst support structure within a housing, whereby the mounting mat holds the fragile structure resiliently within the housing.

59. The method of claim 58, wherein the device comprises an automotive catalytic converter or diesel particulate trap.

60. An end cone for an exhaust gas treatment device comprising:
   outer metallic cone;
   an inner metallic cone; and
   cone insulation disposed between said outer and inner metallic end cones, said cone insulation comprising an intumescent, non-intumescent, or hybrid layer having opposite facing major surfaces and a reinforcing coating layer applied to at least a portion of at least one of said major surfaces, wherein the reinforcing coating layer does not substantially affect the performance properties of the mounting mat and increases the crack resistance of the mounting mat as compared to the same mounting mat without the reinforcing coating layer.

\* \* \* \* \*